US007005399B2

(12) United States Patent
Hosaka

(10) Patent No.: US 7,005,399 B2
(45) Date of Patent: Feb. 28, 2006

(54) CATALYST FOR POLYMERIZATION OF OLEFINS

(75) Inventor: Motoki Hosaka, Chigasaki (JP)

(73) Assignee: Toho Titanium Co., Ltd., Tokyo (JP)

( * ) Notice: Subject to any disclaimer, the term of this patent is extended or adjusted under 35 U.S.C. 154(b) by 287 days.

(21) Appl. No.: 10/148,173

(22) PCT Filed: Sep. 28, 2001

(86) PCT No.: PCT/JP01/08494

§ 371 (c)(1),
(2), (4) Date: May 31, 2002

(87) PCT Pub. No.: WO02/28915

PCT Pub. Date: Apr. 11, 2002

(65) Prior Publication Data

US 2002/0193244 A1 Dec. 19, 2002

(30) Foreign Application Priority Data

Sep. 29, 2000 (JP) ............................ 2000-298768
Sep. 29, 2000 (JP) ............................ 2000-298769
Sep. 29, 2000 (JP) ............................ 2000-298770

(51) Int. Cl.
*B01J 31/00* (2006.01)
*B01J 37/00* (2006.01)
*C08F 4/02* (2006.01)
*C08F 4/60* (2006.01)

(52) U.S. Cl. ...................... 502/132; 502/125; 502/127; 502/128; 502/133

(58) Field of Classification Search ................ 502/125, 502/127, 128, 132, 133
See application file for complete search history.

(56) References Cited

U.S. PATENT DOCUMENTS 5,498,770 A 3/1996 Hosaka et al.
5,684,173 A 11/1997 Hosaka et al.
5,932,510 A 8/1999 Hosaka et al.
5,965,478 A 10/1999 Goto et al.
6,156,690 A 12/2000 Hosaka et al.
6,228,793 B1 5/2001 Hosaka et al.
6,689,849 B1 * 2/2004 Sadashima et al. ......... 526/142
6,800,580 B1 * 10/2004 Yang et al. ................. 502/103
6,806,222 B1 * 10/2004 Yashiki et al. .............. 502/116

FOREIGN PATENT DOCUMENTS

EP 0452916 10/1991
EP 0844260 5/1998

(Continued)

*Primary Examiner*—J. A. Lorengo
*Assistant Examiner*—J. Pasterczyk
(74) *Attorney, Agent, or Firm*—Oblon, Spivak, McClelland, Maier & Neustadt, P.C.

(57) ABSTRACT

An olefin polymerization catalyst comprising: (A) a solid catalyst component prepared by contacting (a) a dialkoxyl magnesium, (b) a tetra-valent titanium halide, and (c) a phthalic acid diester in (d) an aromatic hydrocarbon having a boiling point in the range of 50 to 150° C., (B) an organoaluminum compound of the formula $R^1_pAlQ_{3-p}$, one or more compounds selected from the group consisting of (C) one or more halogen-containing organosilicon compounds selected from ($C^1$) a halogen-containing organosilicon compound of the formula $R^2_lSi(OR^3)_{4-l-m}X_m$ and ($C^2$) a halogen-containing organosilicon compound of the formula $R^4_qSi(OR^5)_{4-q}$, and (D) an organosilicon compound of the formula $R^6_sSi(OR^7)_{4-s}$. The catalyst exhibits excellent activity to hydrogen and the same catalytic activity and yield performance as conventional catalysts, and possesses the capability of producing polymers with stereoregularity equivalent to conventional catalysts.

8 Claims, 1 Drawing Sheet

FOREIGN PATENT DOCUMENTS

| | | |
|---|---|---|
| JP | 61-103910 | 5/1986 |
| JP | 51-171715 | 8/1986 |
| JP | 62-025110 | 2/1987 |
| JP | 01-240507 | 9/1989 |
| JP | 06-100639 | 4/1994 |
| JP | 10-195125 | 7/1998 |
| JP | 10-218932 | 8/1998 |

* cited by examiner

CATALYST FOR POLYMERIZATION OF OLEFINS

TECHNICAL FIELD

The present invention relates to an olefin polymerization catalyst having a high activity to hydrogen and exhibiting high catalytic activity, yield performance, and capability of producing polymers with stereoregularity equivalent to conventional catalysts for polymerization of olefins.

BACKGROUND ART

A solid catalyst component containing magnesium, titanium, an electron donor compound, and halogen as essential components used for the polymerization of olefins such as propylene has been known in the art. Also, a large number of methods for olefin polymerization by polymerization or copolymerization of propylene, in the presence of an olefin polymerization catalyst comprising the above solid catalyst components, an organoaluminum compound, and an organosilicon compound, have been proposed. For example, Japanese Unexamined Patent Publication No. (hereinafter referred to as JP-A) 63310/1982 and JP-A No. 63311/1982 propose a method for polymerization of olefins, particularly olefins with three or more carbon atoms, in which a combined catalyst comprising solid catalyst components containing a magnesium compound, titanium compound, and an electron donor, and an organoaluminum compound and an organosilicon compound having a Si—O—C linkage is used. However, because these methods are not necessarily satisfactory for producing high stereoregularity polymers at a high yield, improvement of these methods has been desired.

JP-A No. 3010/1988 proposes an olefin polymerization catalyst and a polymerization method. The olefin polymerization catalyst comprises a solid catalyst component, obtained by processing a powder produced from dialkoxy magnesium, aromatic dicarboxylic acid diester, aromatic hydrocarbon, and titanium halide with heat, an organoaluminum compound, and an organosilicon compound.

JP-A No. 315406/1989 proposes another olefin polymerization catalyst and a polymerization method using this catalyst. The olefin polymerization catalyst comprises a solid catalyst component prepared by bringing a titanium tetrachloride into contact with a suspension formed by a diethoxymagnesium with an alkylbenzene, adding phthalic dichloride thereto to react to obtain a solid product, and further contacting the resulting solid product with a titanium tetrachloride in the presence of an alkylbenzene, an organic aluminum compound and an organic silicon compound.

All of the above-described conventional technologies have attained certain results in improving the catalyst activity to the extent of permitting dispensing with an ash-removal step for removing catalyst residues such as chlorine and titanium from the formed polymers, improving the yield of stereoregularity polymers, and improving the durability of the catalyst activity during the polymerization.

The polymers produced using these catalysts are used in a variety of applications including formed products such as parts of vehicles and household electric appliances, containers, and films. These products are manufactured by melting polymer powders produced by the polymerization and by forming the melted polymer using any one of various molds. In manufacturing formed products, particularly large products, by injection molding or the like, melted polymers are sometimes required to have high fluidity (melt flow rate).

Accordingly, a number of studies have been undertaken to increase the melt flow rate of polymers.

The melt flow rate greatly depends on the molecular weight of the polymers. In the polymer industry, hydrogen is generally added as a molecular weight regulator for polymers in the polymerization of olefins. In this instance, a large quantity of hydrogen is usually added to produce low molecular weight polymers which are the polymers having a high melt flow rate. However, the quantity of hydrogen which can be added is limited because of the pressure resistance of the reactor from the viewpoint of safety. In order to add a larger amount of hydrogen, the partial pressure of monomers to be polymerized has to be decreased. The decrease in the partial pressure, however, is accompanied by a decrease in productivity. Additionally, use of a large amount of hydrogen may bring about a problem of cost. Development of a catalyst capable of producing polymers with a high melt flow rate by using a smaller amount of hydrogen, in other words, a catalyst which has a high activity to hydrogen and produces a highly stereoregular polymer, while maintaining high yield performance has therefore been desired. Conventional technologies have been insufficient in solving these requirements.

To achieve this objective, JP-A No. 218932/1998 discloses a catalyst for polymerization of olefins comprising a halogen-containing organosilicon compound of the following formula (I) and an organosilicon compound of the following formula (II) as organosilicon compounds:

$$Si(OR^8)_{4-n}Z_n \quad (I)$$

wherein $R^8$ individually represents an alkyl group having 1 to 4 carbon atoms, a cycloalkyl group, a phenyl group, a vinyl group, an allyl group, or an aralkyl group, Z indicates a halogen atom, and n is an integer of 1 to 3;

$$R^9_tSi(OR^{10})_{4-t} \quad (II)$$

wherein the group $R^9$ individually represent an alkyl group having 1 to 12 carbon atoms, a cycloalkyl group, a phenyl group, a vinyl group, an allyl group, or an aralkyl group, $R^{10}$ individually represents an alkyl group having 1 to 4 carbon atoms, a cycloalkyl group, a phenyl group, a vinyl group, an allyl group, or an aralkyl group, and t is 0 or an integer of 1 to 3.

This olefin polymerization catalyst is not yet satisfactory for providing olefin polymers with a sufficient melt flow rate, although certain improvement is seen in the catalyst activity to hydrogen.

Therefore, an object of the present invention is to provide an olefin polymerization catalyst having a high activity to hydrogen and exhibiting high catalytic activity, yield performance, and capability of producing polymers with stereoregularity equivalent to conventional catalyst for polymerization of olefins.

DISCLOSURE OF THE INVENTION

In view of this situation, the inventor of the present invention has conducted extensive studies and has found that a catalyst containing a halogen-containing organosilicon compound of the following formula (2) exhibits a higher catalyst activity to hydrogen than the catalyst comprising the organosilicon compounds (I) and (II) disclosed in JP-A No. 218932/1998. The inventor has further found that high catalyst activity to hydrogen can also be achieved by a catalyst containing a halogen-containing organosilicon compound of the following formula (2) and a halogen-containing organosilicon compound of the following formula (3), and a catalyst containing a halogen-containing organosilicon compound of the following formula (3) and an organosilicon compound of the following formula (4). These findings have led to the completion of the present invention.

Specifically, the present invention provides an olefin polymerization catalyst comprising:

(A) a solid catalyst component prepared by contacting (a) a dialkoxy magnesium, (b) a tetra-valent titanium halide, and (c) a phthalic acid diester in (d) an aromatic hydrocarbon having a boiling point in the range of 50 to 150° C., (B) an organoaluminum compound of the following formula (1), $$R^1_pAlQ_{3-p} \quad (1)$$

wherein $R^1$ is an alkyl group having 1 to 4 carbon atoms, Q is a hydrogen atom or a halogen atom, and p is a real number satisfying an inequality $0<p\leqq 3$, and (c) one or more halogen-containing organosilicon compounds selected from the following components ($C^1$) and ($C^2$), ($C^1$) a halogen-containing organosilicon compound of the following formula (2), $$R^2_1Si(OR^3)_{4-l-m}X_m \quad (2)$$

wherein the group $R^2$ individually represents an alkyl group having 1 to 12 carbon atoms, a cycloalkyl group, a phenyl group, a vinyl group, an allyl group, or an aralkyl group, $R^3$ individually represents an alkyl group having 1 to 4 carbon atoms, a cycloalkyl group, a phenyl group, a vinyl group, an allyl group, or an aralkyl group, and X is a halogen atom selected from a chlorine atom, a bromine atom, and an iodine atom, 1 is 0 or an integer of 1 to 2, and m is an integer of 1 to 3, provided that $1\leqq l+m\leqq 3$, ($C^2$) a halogen-containing organosilicon compound of the following formula (3), $$R^4_qSi(OR^5)_{4-q} \quad (3)$$

wherein $R^4$ individually indicates a linear or branched alkyl group having 1 to 12 carbon atoms, with one or two hydrogen atoms replaced by halogen atoms, $R^5$ individually represents an alkyl group having 1 to 4 carbon atoms, a cycloalkyl group, a phenyl group, a vinyl group, an allyl group, or an aralkyl group, and q is an integer satisfying an inequality of $1\leqq q\leqq 3$.

The present invention further provides an olefin polymerization catalyst comprising:

(A) a solid catalyst component prepared by contacting (a) a dialkoxy magnesium, (b) a tetra-valent titanium halide, and (c) a phthalic acid diester in (d) an aromatic hydrocarbon having a boiling point in the range of 50 to 150° C., (B) an organoaluminum compound of the following formula (1), $$R^1_pAlQ_{3-p} \quad (1)$$

wherein $R^1$ is an alkyl group having 1 to 4 carbon atoms, Q is a hydrogen atom or a halogen atom, and p is a real number satisfying an inequality $0<p\leqq 3$, ($C^2$) a halogen-containing organosilicon compound of the following formula (3), $$(R^4)_qSi(OR^5)_{4-q} \quad (3)$$

wherein $R^4$ individually indicates a linear or branched alkyl group having 1 to 12 carbon atoms, with one or two hydrogen atoms replaced by halogen atoms, $R^5$ individually represents an alkyl group having 1 to 4 carbon atoms, a cycloalkyl group, a phenyl group, a vinyl group, an allyl group, or an aralkyl group, and q is an integer satisfying an inequality of $1\leqq q\leqq 3$, and (D) an organosilicon compound of the following formula (4), $$R^6_sSi(OR^7)_{4-s} \quad (4)$$

wherein $R^6$ individually represents an alkyl group having 1 to 12 carbon atoms, a cycloalkyl group, a phenyl group, a vinyl group, an allyl group, or an aralkyl group, $R^7$ individually represents an alkyl group having 1 to 4 carbon atoms, a cycloalkyl group, a phenyl group, a vinyl group, an allyl group, or an aralkyl group, with $R^6$ and $R^7$ being either the same or different, and s is an integer satisfying $0\leqq s\leqq 3$.

BEST MODE FOR CARRYING OUT THE INVENTION

Figure 1:
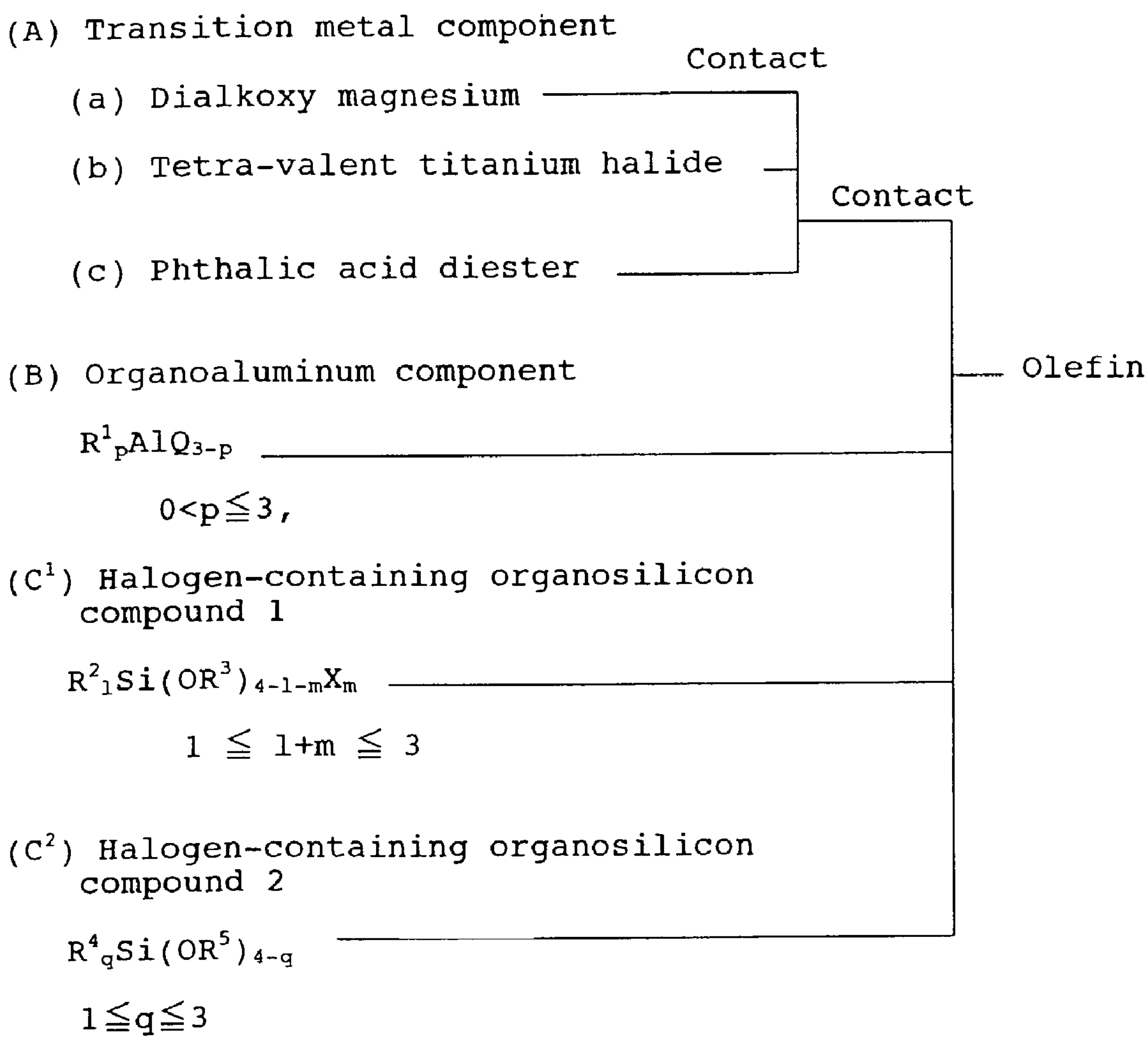
FIG. 1 is a flow chart showing a process for preparing the polymerization catalyst of the present invention.

As the dialkoxy magnesium (a) (hereinafter may be referred to as "component (a)") used for preparing the solid catalyst component (A) (hereinafter may be referred to as "component (A)") in the olefin polymerization catalyst of the present invention, a compound represented by the formula $Mg(OR^{11})(OR^{12})$, wherein $R^{11}$ and $R^{12}$ individually represent an alkyl group having 1 to 10 carbon atoms, and $R^{11}$ and $R^{12}$ may be either identical or different, is preferable. Specific examples include dimethoxy magnesium, diethoxy magnesium, dipropoxy magnesium, dibutoxy magnesium, ethoxymethoxy magnesium, ethoxypropoxy magnesium, butoxyethoxy magnesium, and the like. Of these, diethoxy magnesium is particularly preferable. These dialkoxy magnesium may be prepared by reacting metallic magnesium with an alcohol in the presence of a halogen or a halogen-containing metal compound. The above dialkoxy magnesium may be used either individually or in combination of two or more.

The dialkoxy magnesium compound used for the preparation of the component (A) in the present invention may be either in the form of granules or powder and either amorphous or spherical in the configuration. For example, when spherical dialkoxy magnesium is used, the resulting polymer is in the form of a powder having an excellent granular form and a narrow particle distribution. This improves handling and processability of the polymer powder produced during polymerization operation and eliminates problems such as clogging caused by fine particles contained in the polymer powder.

The spherical dialkoxy magnesium need not necessarily be completely round in shape, but may be oval or potato-shaped. Specifically, the particles may have a ratio (l/w) of the major axis diameter (l) to the minor axis diameter (w) usually of 3 or less, preferably from 1 to 2, and more preferably from 1 to 1.5.

Dialkoxy magnesium with an average particle size from 1 to 200 μm can be used. A more preferable average particle size is 5 to 150 μm. In the case of spherical dialkoxy magnesium, the average particle size is usually from 1 to 100 μm, preferably from 5 to 50 μm, and more preferably from 10 to 40 μm. A powder having a narrow particle size distribution with a smaller fine and coarse powder content is preferably used. Specifically, the content of particles with a diameter of 5 μm or less is 20% or less, and preferably 10% or less. On the other hand, the content of particles with a diameter of 100 μm or more should be 10% or less, and preferably 5% or less. Moreover, the particle size distribution represented by ln(D90/D10), wherein D90 is a particle size of 90% of the integrated particle size and D10 is a particle size of 10% of the integrated particle size, is 3 or less, and preferably 2 or less.

Methods of producing such spherical dialkoxy magnesium are described in, for example, JP-A No. 41832/1983, JP-A No. 51633/1987, JP-A No. 74341/1991, JP-A No. 368391/1992, and JP-A No. 73388/1996.

The tetra-valent titanium halide compound (b) (hereinafter referred to from time to time as "component (b)") used for the preparation of the component (A) in the present invention is one or more compounds selected from titanium halides and alkoxy titanium halides of the formula $Ti(OR^{13})_nX_{4-n}$, wherein $R^{13}$ indicates an alkyl group having 1 to 4 carbon atoms, X is a halogen atom selected from a chlorine atom, bromine atom, iodine atom, and the like, and n is an integer of $0 \leqq n \leqq 4$.

Specific examples include, as titanium halides, titanium tetrahalides such as titanium tetrachloride, titanium tetrabromide, and titanium tetraiodide and, as alkoxytitanium halides, methoxy titanium trichloride, ethoxy titanium trichloride, propoxy titanium trichloride, n-butoxy titanium trichloride, dimethoxy titanium dichloride, diethoxy titanium dichloride, dipropoxy titanium dichloride, di-n-butoxy titanium dichloride, trimethoxy titanium chloride, triethoxy titanium chloride, tripropoxy titanium chloride, and tri-n-butoxy titanium chloride. Of these, titanium tetrahalides are preferable, with titanium tetrachloride being particularly preferable. These titanium compounds may be used either individually or in combination of two or more.

Particularly preferable phthalic acid diesters (c) (hereinafter referred to from time to time as "component (c)") used in the preparation of the component (A) of the present invention have a linear or branched alkyl group with 2 to 10 carbon atoms as the alkyl group in the alkoxycarbonyl group. Specific examples are dimethyl phthalate, diethyl phthalate, di-n-propyl phthalate, di-isopropyl phthalate, di-n-butyl phthalate, di-isobutyl phthalate, ethylmethyl phthalate, methyl(isopropyl) phthalate, ethyl(n-propyl) phthalate, ethyl(n-butyl) phthalate, ethyl(isobutyl) phthalate, di-n-pentyl phthalate, di-iso-pentyl phthalate, dihexyl phthalate, di-n-heptyl phthalate, di-n-octyl phthalate, bis(2,2-dimethylhexyl) phthalate, bis(2-ethylhexyl) phthalate, di-n-nonyl phthalate, di-isodecyl phthalate, bis(2,2-dimethylheptyl) phthalate, n-butyl(isohexyl) phthalate, n-butyl(2-ethylhexyl) phthalate, n-pentylhexyl phthalate, n-pentyl(isohexyl) phthalate, iso-pentyl(heptyl) phthalate, n-pentyl(2-ethylhexyl) phthalate, n-pentyl (isononyl) phthalate, iso-pentyl (n-decyl) phthalate, n-pentylundecyl phthalate, iso-pentyl (isohexyl) phthalate, n-hexyl(2-ethylhexyl) phthalate, n-hexyl(2-ethylhexyl) phthalate, n-hexyl(isononyl) phthalate, n-hexyl(n-decyl) phthalate, n-heptyl(2-ethylhexyl) phthalate, n-heptyl (isononyl) phthalate, n-heptyl(neodecyl) phthalate, and 2-ethylhexyl(isononyl) phthalate. These are used either singly or in combination of two or more.

Of these, phthalic acid diesters in which the alkoxycarbonyl group has two identical alkyl groups are preferable, with diethyl phthalate, di-n-propyl phthalate, di-isopropyl phthalate, di-n-butyl phthalate, di-isobutyl phthalate, di-n-octyl phthalate, bis(2-ethylhexyl) phthalate, and di-isodecyl phthalate being particularly preferable.

The component (A) of the present invention can be prepared by contacting the above components (a), (b), and (c) in an aromatic hydrocarbon (d) with a boiling point of 50 to 150° C. (hereinafter referred to from time to time as "component (d)"). Toluene, xylene, and ethylbenzene are preferably used as the component (d). These aromatic hydrocarbons can be used either individually or in combination of two or more.

In addition to the above components (a) to (d), an aluminum compound, a metal salt of an organic acid, or polysiloxane can be used for the preparation of the solid catalyst component (A) of the present invention. These compounds are effective in controlling the crystalline properties of the produced polymers.

As specific examples of the aluminum compound, aluminum trichloride, diethoxy aluminum chloride, di-iso-propoxy aluminum chloride, ethoxy aluminum dichloride, isopropoxy aluminum dichloride, butoxy aluminum dichloride, triethoxy aluminum, and the like can be given.

As examples of the metal salt of organic acid, sodium stearate, magnesium stearate, and aluminum stearate can be given.

Polysiloxanes are generally called silicon oil. Those used in the present invention are chain-structured, partially hydrogenated, cyclic, or denatured polysiloxanes which are liquids or viscous substances at normal temperatures with a viscosity at 25° C. in the range of 2 to 10,000 cSt, and preferably in the range of 3 to 500 cSt.

As examples of chain-structured polysiloxanes, dimethyl polysiloxane and methylphenyl polysiloxane can be given; as partially hydrogenated polysiloxanes, methyl hydrogen polysiloxanes with a hydrogenation degree of 10 to 80% can be given; as cyclic polysiloxanes, hexamethylcyclotrisiloxane, octamethylcyclotetrasiloxane, decamethylcyclopentasiloxane, 2,4,6-trimethylcyclotrisiloxane, 2,4,6,8-tetramethyl cyclotetrasiloxane can be given; as denatured polysiloxanes, higher fatty acid group-substituted dimethyl siloxane, epoxy group-substituted dimethyl siloxane, and polyoxyalkylene group-substituted dimethyl siloxane, and the like can be given.

The process of preparing the component (A) of the present invention will now be described.

One specific example of the process for preparing the solid component (A) comprises suspending the dialkoxy magnesium (a) in the tetra-valent titanium halide (b) or the aromatic hydrocarbon (d) having a boiling point in the range of 50 to 150° C., and causing the phthalic acid diester (c) and/or the tetra-valent titanium halide (b) to come into contact with the suspension. A spherical solid catalyst component with a narrow particle size distribution can be obtained by this process using a spherical magnesium compound. Such a spherical solid catalyst component with a narrow particle size distribution can also be obtained without using a spherical magnesium compound if particles are formed by a spray dry method in which a solution or suspension is sprayed and dried using a sprayer, for example.

Contact of these components is carried out in a vessel equipped with a stirrer in an inert gas atmosphere from which water and the like have been removed while stirring. When the components are caused to come contact by stirring the mixture or when a denaturing treatment is carried out by dispersing or suspending the components, the mixture is stirred at a comparatively low temperature of around room temperature. When a reaction product is to be obtained by reacting the components after the contact, the stirring is preferably carried out at a temperature range of 40 to 130°

C. The reaction does not sufficiently proceed at a reaction temperature below 40° C., resulting in a solid component with inadequate properties. On the other hand, control of the reaction becomes difficult at a temperature above 130° C. due to vaporization of the solvent and the like. The reaction time is one minute or more, preferably ten minutes or more, and still more preferably 30 minutes or more.

As preferable processes for preparing the solid catalyst component (A) of the present invention, a process comprising suspending the component (a) in the component (d), causing the resulting suspension to come in contact with the component (b), then with the component (c), and causing these components to react, a process comprising suspending the component (a) in the component (d), causing the resulting suspension to come in contact with the component (c), then with the component (b), and causing these components to react, and other similar processes can be given.

The following examples are given as the order of contacting the components in preparing the solid catalyst component (A) of the present invention.

(1) (a)→(d)→(b)→(c)→<<intermediate washing→(d)→(b)>>→final washing→solid catalyst component (A)

(2) (a)→(d)→(c)→(b)→<<intermediate washing→(d)→(b)))>>→final washing→solid catalyst component (A)

(3)(a)→(d)→(b)→(c)→<<intermediate washing→(d)→(b)→(c)>>→final washing→solid catalyst component (A)

(4) (a)→(d)→(b)→(c)→<<intermediate washing→(d)→(c)→(b)>>→final washing→solid catalyst component (A)

(5) (a)→(d)→(c)→(b)→<<intermediate washing→(d)→(b)→(c)>>→final washing→solid catalyst component (A)

(6) (a)→(d)→(c)→(b)→<<intermediate washing→(d)→(c)→(b)>>→final washing→solid catalyst component (A)

If required, further improvement of the catalyst activity can be achieved if the steps in the double parentheses << >> in the above processes of contact are repeated several times. The components (b) or (d) used in the steps in the double parentheses << >> may be either freshly added components or residues from the previous steps. In addition, an aluminum compound, a metal salt of organic acid, or polysiloxane may be caused to contact the reaction mixture at any point of the above contact processes. In addition to the washing steps indicated in the above processes (1) to (6), the intermediate products in any of the above contact steps may be washed with a hydrocarbon compound which is liquid at normal temperatures.

Based on the above description, a particularly preferable process for preparing the solid catalyst component (A) comprises suspending the dialkoxy magnesium (a) in the aromatic hydrocarbon (d) having a boiling point in the range of 50 to 150° C., causing the tetra-valent titanium halide (b) to contact the suspension, and reacting the mixture. In the above process, one or more phthalic acid diesters (c) are caused to come in contact with the suspension at a temperature from −20° C. to 130° C., either before or after the tetra-valent titanium halide (b) is contacted, to obtain a solid reaction product (1). In this instance, it is desirable to carry out an aging reaction at a low temperature either before or after the above one or more phthalic acid diesters (c) are caused to contact the suspension. After washing the solid reaction product (1) with a hydrocarbon compound which is liquid at normal temperatures (intermediate washing), the tetra-valent titanium halide (b) is again caused to contact the solid reaction product (1) in the presence of an aromatic hydrocarbon compound at a temperature from −20° C. to 100° C., and resulting suspension is subjected to a reaction to obtain a solid reaction product (2). A method of again contacting one or more phthalic acid diesters (c), either before or after the tetra-valent titanium halide (b) is caused to contact the solid reaction product (1), is another preferred embodiment. As required, the intermediate washing and the reaction may be further repeated several times. Next, the solid reaction product (2) is washed with a hydrocarbon compound which is liquid at normal temperatures (final washing) to obtain the solid catalyst component (A).

Preferable conditions of the above reactions and washing operations are as follows.

Low temperature aging reaction: −20° C. to 70° C., preferably −10° C. to 60° C., and more preferably 0° C. to 30° C., for 1 minute to 6 hours, preferably 5 minutes to 4 hours, and particularly preferably 10 minutes to 3 hours.

Reaction: 40° C. to 130° C., preferably 70° C. to 120° C., and particularly preferably 80° C. to 115° C., for 0.5 to 6 hours, preferably 0.5 to 5 hours, and particularly preferably 1 to 4 hours.

Washing: at 0° C. to 110° C., preferably 30° C. to 100° C., and more preferably 30° C. to 90° C., from 1 to 20 times, preferably 1 to 15 times, and particularly preferably 1 to 10 times.

Hydrocarbons used for washing are preferably aromatic hydrocarbons or saturated hydrocarbons which are liquid at ordinary temperatures. Specific examples are aromatic hydrocarbons such as toluene, xylene, ethylbenzene and the like, and saturated hydrocarbons such as hexane, heptane, cyclohexane, and the like. The aromatic hydrocarbons preferably are used for the intermediate washing, whereas the saturated hydrocarbons are preferably used for the final washing. Toluene, xylene, ethylbenzene, and the like can be given as aromatic hydrocarbon compounds used when the solid reaction product (1) is again contacted with a tetravalent titanium halide (b) after washing with a hydrocarbon compound which is liquid at normal temperatures (intermediate washing).

The ratio of the compounds used for the preparation of the solid catalyst component (A) cannot be generically defined, because such a ratio varies according to the process employed. For example, the tetra-valent titanium halide (b) is used in an amount from 0.5 to 100 mols, preferably from 0.5 to 50 mols, still more preferably from 1 to 10 mols; the phthalic acid diester (c) is used in an amount from 0.01 to 10 mols, preferably from 0.01 to 1 mol, and still more preferably from 0.02 to 0.6 mol; and the aromatic hydrocarbons (d) are used in an amount from 0.001 to 500 mols, preferably from 0.001 to 100 mols, and still more preferably from 0.005 to 10 mols; for one mol of the dialkoxy magnesium (a).

There are also no specific limitations to the amount of titanium, magnesium, halogen atoms, and phthalic acid diesters in the solid catalyst component (A) of the present invention. The content of titanium is 1.0 to 8.0 wt %, preferably 2.0 to 8.0 wt %, and more preferably 3.0 to 8.0 wt %; the content of magnesium is 10 to 70 wt %, preferably 10 to 50 wt %, more preferably 15 to 40 wt %, and particularly preferably 15 to 25 wt %; the content of halogen atoms is 20 to 80 wt %, preferably 30 to 85 wt %, more preferably 40 to 80 wt %, and particularly preferably 45 to 75 wt %; and the total amount of phthalic acid diesters is 0.5 to 30 wt %, preferably 1 to 25 wt %, and particularly preferably 2 to 20 wt %.

There are no specific limitations to the organoaluminum compound (B) (hereinafter referred to from time to time simply as "component (B)") used for preparing the olefin polymerization catalyst of the present invention, inasmuch as the compound has a structure of the above formula (1). In the formula (1), an ethyl group and an isobutyl group are preferable as $R^1$, a hydrogen atom, a chlorine atom, and a bromine atom are preferable as Q, and p is preferably an integer of 2 or 3, and particularly preferably 3. As specific examples of such organoaluminum compounds (B), triethyl aluminum, diethyl aluminum chloride, tri-isobutyl aluminum, diethyl aluminum bromide, and diethyl aluminum hydride can be given. These compounds may be used either individually or in combination of two or more. Triethyl aluminum and tri-isobutyl aluminum are preferably used.

One or more compounds selected from the group consisting of the halogen-containing organosilicon compounds ($C^1$) represented by the above formula (2) (hereinafter referred to from time to time as "component ($C^1$)") and halogen-containing organosilicon compounds ($C^2$) represented by the above formula (3) (hereinafter referred to from time to time as "component ($C^2$)") can be used as the halogen-containing organosilicon compound (C) (hereinafter referred to from time to time as "component (C)") in the preparation of the olefin polymerization catalyst of the present invention. When only the component ($C^1$) is used as the component (C), it is desirable to not use the organosilicon compound (D) of the above formula (4) for improving the catalyst activity to hydrogen. When both the component ($C^1$) and component ($C^2$) are used as the component (C), it is desirable not to use the organosilicon compound (D) of the above formula (4) for improving the catalyst activity to hydrogen.

As examples of preferable groups for $R^2$ in the formula (2), a methyl group, an ethyl group, a n-propyl group, an isopropyl group, an n-butyl group, a t-butyl group, a n-pentyl group, an isopentyl group, a neopentyl group, a n-hexyl group, a n-heptyl group, a n-octyl group, an iso-octyl group, a cyclohexyl group, and a cyclopentyl group can be given. Of these, a methyl group, a n-butyl group, a t-butyl group, a cyclohexyl group, and a cyclopentyl group are particularly preferable. As $R^3$, alkyl groups having 1 to 4 carbon atoms are preferable, with a methyl group and an ethyl group being particularly preferable. As X, a chlorine atom and a bromine atom are preferable, with a chlorine atom being particularly preferable. As 1, 0 or 1 is preferable, but 0 is particularly preferable. m is preferably 1 or 2. As such halogen-containing organosilicon compounds, trialkoxychlorosilane, trialkoxybromosilane, dialkoxydichlorosilane, dialkoxy dibromosilane, alkyldialkoxychlorosilane, alkyldialkoxy bromosilane, cycloalkyldialkoxychlorosilane, and cycloalkyl dialkoxybromosilane are preferable. Of these, trialkoxy chlorosilane, dialkoxydichlorosilane, alkyldialkoxy chlorosilane, and cycloalkyldialkoxychlorosilane are particularly preferable.

The following compounds can be given as preferable halogen-containing organosilicon compound ($C^1$) of the above formula (2): trimethoxychlorosilane, triethoxychlorosilane, trimethoxybromosilane, triethoxybromosilane, dimethoxy dichlorosilane, diethoxydichlorosilane, dimethoxy dibromosilane, diethoxydibromosilane, methyldimethoxy chlorosilane, methyldiethoxychlorosilane, methyldimethoxy bromosilane, methyldiethoxybromosilane, ethyldimethoxy chlorosilane, ethyldiethoxychlorosilane, ethyldimethoxy bromosilane, ethyldiethoxybromosilane, n-propyldimethoxy chlorosilane, n-propyldiethoxychlorosilane, n-propyl dimethoxybromosilane, n-propyldiethoxybromosilane, isopropyldimethoxychlorosilane, isopropyldiethoxy chlorosilane, isopropyldimethoxybromosilane, isopropyl diethoxybromosilane, n-butyldimethoxychlorosilane, n-butyl diethoxychlorosilane, n-butyldimethoxybromosilane, n-butyl diethoxybromosilane, isobutyldimethoxychlorosilane, isobutyl diethoxychlorosilane, isobutyldimethoxybromosilane, isobutyl diethoxybromosilane, t-butyldimethoxychlorosilane, t-butyl diethoxychlorosilane, t-butyldimethoxybromosilane, t-butyl diethoxybromosilane, n-pentyldimethoxychlorosilane, n-pentyl diethoxychlorosilane, n-pentyldimethoxybromosilane, n-pentyl diethoxybromosilane, isopentyldimethoxychlorosilane, isopentyldiethoxychlorosilane, isopentyldimethoxy bromosilane, isopentyldiethoxybromosilane, neopentyl dimethoxychlorosilane, neopentyldiethoxychlorosilane, neopentyldimethoxybromosilane, neopentyldiethoxybromosilane, n-hexyldimethoxychlorosilane, n-hexyldiethoxychlorosilane, n-hexyldimethoxybromosilane, n-hexyldiethoxybromosilane, n-heptyldimethoxychlorosilane, n-heptyldiethoxychlorosilane, n-heptyldimethoxybromosilane, n-heptyldiethoxybromosilane, n-octyldimethoxychlorosilane, n-octyldiethoxychlorosilane, n-octyldimethoxybromosilane, n-octyldiethoxybromosilane, isooctyldimethoxychlorosilane, isooctyldiethoxychlorosilane, isooctyldimethoxybromosilane, isooctyldiethoxybromosilane, cyclohexyldimethoxychlorosilane, cyclohexyldiethoxy chlorosilane, cyclohexyldimethoxybromosilane, cyclohexyl diethoxybromosilane, cyclopentyldimethoxychlorosilane, cyclopentyldiethoxychlorosilane, cyclopentyldimethoxy bromosilane, and cyclopentyldiethoxybromosilane. Of these, preferable compounds are triethoxychlorosilane, diethoxy dichlorosilane, methyldimethoxychlorosilane, methyldiethoxy chlorosilane, n-butyldiethoxychlorosilane, t-butyldimethoxy chlorosilane, t-butyldiethoxychlorosilane, cyclohexyl dimethoxychlorosilane, and cyclopentyldimethoxychlorosilane.

A particularly preferable compounds are triethoxy chlorosilane, diethoxydichlorosilane, and methyldimethoxy chlorosilane.

As $R^4$ in the formula (3), an alkyl group having 1 to 4 carbon atoms in which one or two hydrogen atoms are replaced by a halogen atom is preferable. Particularly preferable groups as $R^4$are a chloromethylene group ($ClCH_2$ group), dichloro methylidine group ($Cl_2CH$ group), bromomethylene group ($BrCH_2$ group), dibromomethylidine group ($Br_2CH$ group), chloroethylidene group ($ClC_2H_4$ group), dichloroethylidine group ($Cl_2C_2H_3$), bromoethylidene group ($BrC_2H_4$ group), and dibromoethylidine group ($Br_2C_2H_3$ group).

When q is 2 or more, it is preferable that all $R^4$ groups be the same. As $R^5$, an alkyl group having 1 to 4 carbon atoms is preferable, with a methyl group and an ethyl group being particularly preferable. As such halogen-containing organosilicon compounds, halogenated alklytrialkoxysilane, dihalogenated alkyldialkoxysilane, trihalogenated alkylalkoxysilane can be given. Of these, halogenated alklytrialkoxysilane and dihalogenated alkyldialkoxysilane are preferable, with halogenated alkyltrialkoxysilane being particularly preferable.

The following compounds can be given as preferable halogen-containing organosilicon compound ($C^2$) of the above formula (3):

$ClCH_2Si(OCH_3)_3$, $ClCH_2Si(OC_2H_5)_3$, $Cl_2CHSi(OCH_3)_3$, $Cl_2CHSi(OC_2H_5)_3$, $BrCH_2Si(OCH_3)_3$, $BrCH_2Si(OC_2H_5)_3$, $Br_2CHSi(OCH_3)_3$, $Br_2CHSi(OC_2H_5)_3$, $ClC_2H_4Si(OCH_3)_3$, $ClC_2H_4Si(OC_2H_5)_3$, $Cl_2C_2H_3Si(OCH_3)_3$, $Cl_2C_2H_3Si(OC_2H_5)_3$, $BrC_2H_4Si(OCH_3)_3$, $BrC_2H_4Si(OC_2H_5)_3$, $Br_2C_2H_3Si(OCH_3)_3$, $Br_2C_2H_3Si(OC_2H_5)_3$, $(ClCH_2)_2Si(OCH_3)_2$, $(ClCH_2)_2Si(OC_2H_5)_2$, $(Cl_2CH)_2Si(OCH_3)_2$, $(Cl_2CH)_2Si(OC_2H_5)_2$, $(BrCH_2)_2Si(OCH_3)_2$, $(BrCH_2)_2Si(OC_2H_5)_2$, $(Br_2CH)_2Si(OCH_3)_2$, $(Br_2CH)_2Si(OC_2H_5)_2$, $(ClC_2H_4)_2Si(OCH_3)_2$, $(ClC_2H_4)_2Si(OC_2H_5)_2$, $(Cl_2C_2H_3)_2Si(OCH_3)_2$, $(Cl_2C_2H_3)_2Si(OC_2H_5)_2$, $(BrC_2H_4)_2Si(OCH_3)_2$, $(BrC_2H_4)_2Si(OC_2H_5)_2$, $(Br_2C_2H_3)_2Si(OCH_3)_2$, $(Br_2C_2H_3)_2Si(OC_2H_5)_2$, $(ClCH_2)_3Si(OCH_3)$, $(ClCH_2)_3Si(OC_2H_5)$, $(Cl_2CH)_3Si(OCH_3)$, $(Cl_2CH)_3Si(OC_2H_5)$, $(BrCH_2)_3Si(OCH_3)$, $(BrCH_2)_3Si(OC_2H_5)$, $(Br_2CH)_3Si(OCH_3)$, $(Br_2CH)_3Si(OC_2H_5)$, $(ClC_2H_4)_3Si(OCH_3)$, $(ClC_2H_4)_3Si(OC_2H_5)$, $(Cl_2C_2H_3)_3Si(OCH_3)$, $(Cl_2C_2H_3)_3Si(OC_2H_5)$, $(BrC_2H_4)_3Si(OCH_3)$, $(BrC_2H_4)_3Si(OC_2H_5)$, $(Br_2C_2H_3)_3Si(OCH_3)$, $(Br_2C_2H_3)_3Si(OC_2H_5)$.

Of these, $ClCH_2Si(OCH_3)_3$, $ClCH_2Si(OC_2H_5)_3$, $BrCH_2Si(OCH_3)_3$, $BrCH_2Si(OC_2H_5)_3$, $(ClCH_2)_2Si(OCH_3)_2$, $(ClCH_2)_2Si(OC_2H_5)_2$, $(BrC_2H_4)_2Si(OCH_3)_2$, and $(BrC_2H_4)_2Si(OC_2H_5)_2$ are preferably used, with $ClCH_2Si(OC_2H_5)_3$ being particularly preferable.

These halogen-containing organosilicon compounds can be used either individually or in combination of two or more.

In addition to the component (C), an organosilicon compound (D) of the above formula (4) (hereinafter referred to from time to time as "component (D)") can also be used as a catalytic component.

As examples of such an organosilicon compound (D), phenyl alkoxysilane, alkyl alkoxysilane, phenylalkyl alkoxysilane, cycloalkyl alkoxysilane, and cycloalkylalkyl alkoxysilane can be given.

Specific examples of the organosilicon compound (D) include trimethylmethoxysilane, trimethylethoxysilane, tri-n-propylmethoxysilane, tri-n-propylethoxysilane, tri-n-butylmethoxysilane, triisobutylmethoxysilane, trineopentylmethoxysilane, tri-n-butylethoxysilane, tricyclohexylmethoxysilane, tricyclohexylethoxysilane, cyclohexyldimethylmethoxysilane, cyclohexyldiethyl methoxysilane, cyclohexyldiethylethoxysilane, dimethyl dimethoxysilane, dimethyldiethoxysilane, di-n-propyl dimethoxysilane, diisopropyldimethoxysilane, di-n-propyl diethoxysilane, diisopropyldiethoxysilane, di-n-butyl dimethoxysilane, diisobutyldimethoxysilane, di-t-butyl dimethoxysilane, di-n-butyldiethoxysilane, n-butylmethyl dimethoxysilane, bis(2-ethylhexyl)dimethoxysilane, bis (2-ethylhexyl)diethoxysilane, dicyclopentyldimethoxysilane, dicyclopentyldiethoxysilane, dicyclohexyldimethoxysilane, dicyclohexyldiethoxysilane, bis(3-methylcyclohexyl) dimethoxysilane,bis(4-methylcyclohexyl) dimethoxysilane, bis(3,5-dimethylcyclohexyl) dimethoxysilane, cyclohexyl cyclopentyldimethoxysilane, cyclohexylcyclopentyl diethoxysilane, cyclohexylcyclopentyldipropoxysilane, 3-methylcyclohexylcyclopentyldimethoxysilane, 4-methyl cyclohexylcyclopentyldimethoxysilane, 3,5-dimethylcyclo hexylcyclopentyldimethoxysilane, 3-methylcyclo hexylcyclohexyldimethoxysilane, 4-methylcyclo hexylcyclohexyldimethoxysilane, 3,5-dimethylcyclohexyl cyclohexyldimethoxysilane, cyclopentylmethyldimethoxy silane, cyclopentylmethyldiethoxysilane, cyclopentylethyl diethoxysilane, cyclopentyl(isopropyl)dimethoxysilane, cyclopentyl(isobutyl)dimethoxysilane, cyclohexylmethyl dimethoxysilane, cyclohexylmethyldiethoxysilane, cyclohexyl ethyldimethoxysilane, cyclohexylethyldiethoxysilane, cyclohexyl(n-propyl)dimethoxysilane, cyclohexyl(isopropyl) dimethoxysilane, cyclohexyl(n-propyl)diethoxysilane, cyclohexyl(isobutyl)dimethoxysilane, cyclohexyl(n-butyl) diethoxysilane, cyclohexyl(n-pentyl)dimethoxysilane, cyclohexyl(n-pentyl)diethoxysilane, diphenyldimethoxysilane, diphenyldiethoxysilane, phenylmethyldimethoxysilane, phenyl methyldiethoxysilane, phenylethyldimethoxysilane, phenyl ethyldiethoxysilane, methyltrimethoxysilane, methyl triethoxysilane, ethyltrimethoxysilane, ethyltriethoxysilane, n-propyltrimethoxysilane, isopropyltrimethoxysilane, n-propyltriethoxysilane, isopropyltriethoxysilane, n-butyl trimethoxysilane, isobutyltrimethoxysilane, t-butyl trimethoxysilane, n-butyltriethoxysilane, 2-ethylhexyl trimethoxysilane, 2-ethylhexyltriethoxysilane, cyclopentyl trimethoxysilane, cyclopentyltriethoxysilane, cyclohexyl trimethoxysilane, cyclohexyltriethoxysilane, vinyl trimethoxysilane, vinyltriethoxysilane, phenyltrimethoxy silane, phenyltriethoxysilane, tetramethoxysilane, tetraethoxysilane, tetrapropoxysilane, tetrabutoxysilane, and the like.

Of these, di-n-propyldimethoxysilane, diisopropyl dimethoxysilane, di-n-butyldimethoxysilane, diisobutyl dimethoxysilane, di-t-butyldimethoxysilane, di-n-butyl diethoxysilane, t-butyltrimethoxysilane, dicyclohexyl dimethoxysilane, dicyclohexyldiethoxysilane, cyclohexyl methyldimethoxysilane, cyclohexylmethyldiethoxysilane, cyclohexylethyldimethoxysilane, cyclohexylethyl diethoxysilane, dicyclopentyldimethoxysilane, dicyclopentyl diethoxysilane, cyclopentylmethyldimethoxysilane, cyclopentylmethyldiethoxysilane, cyclopentyl ethyldiethoxysilane, cyclohexylcyclopentyldimethoxysilane, cyclohexylcyclopentyldiethoxysilane, 3-methylcyclohexyl cyclopentyldimethoxysilane, 4-methylcyclohexyl cyclopentyldimethoxysilane, 3,5-dimethylcyclohexyl cyclopentyldimethoxysilane, tetramethoxysilane, and tetraethoxysilane are preferably used, with tetramethoxy silane and and tetraethoxysilane being particularly preferable.

Either one type of these organosilicon compounds or a combination of two or more types of these compounds can be used in the present invention.

Polymerization or copolymerization of olefins can be carried out using the olefin polymerization catalyst of the present invention. As olefins, ethylene, propylene, 1-butene, 1-pentene, 4-methyl-1-pentene, vinyl cyclohexane, and the like can be used either individually or in combination of two or more. Of these, ethylene, propylene, and 1-butene can be suitably used. A particularly preferable olefin is propylene. Propylene may be copolymerized with other olefins. As copolymerized olefins, ethylene, 1-butene, 1-pentene, 4-methyl-1-pentene, vinyl cyclohexane, and the like can be used either individually or in combination of two or more. Of these, ethylene and 1-butene can be suitably used.

The ratio of each component used is not specifically limited inasmuch as such a ratio does not influence the effect of the present invention. Usually, the component (B) is used in the amount of 1 to 2000 mols, and preferably 50 to 1000 mols, per one mol of titanium atom in the component (A). The total amount of the components (C) and (D) used per one mol of the component (B) is 0.002 to 10 mols, preferably 0.01 to 2 mols, and particularly preferably 0.01 to 0.5 mols.

Although the order of contact of these components is optional, it is desirable to first add the organoaluminum compound (B) to the polymerization system, then cause the component (C) or the components (C) and (D) to come in contact with the organoaluminum compound (B), and cause the solid catalyst component (A) to contact the resulting mixture. A method of forming a catalyst by adding the organoaluminum compound (B) to the polymerization system, and causing the organoaluminum compound (B) to come in contact with a previously contacted mixture of the component (A) and component (C) or the components (C) and (D) in the polymerization system is also a preferable embodiment. It is possible to further improve the catalyst activity to hydrogen by using a previously contacted mixture of the component (A) and component (C) or the components (C) and (D). When the components (C) and (D) are used in combination, these components may be previously mixed before the contacting operation, or may be individually caused to contact. Previously mixing before contact is more preferable. In this instance, although the component (C) and component (D) are used at any optional ratio, the molar ratio of the component (C) and component (D) is preferably in the range of 10:90 to 90:10, more preferably in the range of 30:70 to 70:30, and particularly preferably in the range of 40:60 to 60:40.

The polymerization of the present invention can be carried out either in the presence or absence of an organic solvent. Olefin monomers such as propylene may be used either in a gaseous or liquid state. The polymerization reaction is preferably carried out at a temperature of 200° C. or less, and preferably at 100° C. or less, under a pressure of 10 MPa or less, and preferably 5 MPa or less. Either a continuous polymerization system or a batch polymerization system may be used for the polymerization reaction. In addition, the polymerization can be completed either in one step or in two or more steps.

In polymerizing olefins using the catalyst containing the component (A), component (B), and component (C) or the component (C) and component (D) (hereinafter referred to from time to time as "the main polymerization"), it is desirable to preliminarily polymerize the olefins prior to the main polymerization reaction to improve the catalytic activity, stereoregularity, properties of resulting polymer particles, and the like. In addition to the olefins used in the main polymerization reaction, monomers such as styrene can be used in the preliminary polymerization. Specifically, the component (A), component (B), and component (C) or the component (C) and component (D) are added to the polymerization system in the presence of olefins to preliminarily polymerize 0.1 to 100 g of the polyolefins for 1 g of the component (A). In a particularly preferable embodiment, the component (B) is further added to form the catalyst.

Although the order of contact of the components and monomers in carrying out the preliminary polymerization is optional, it is desirable to first add the component (B) to the preliminary polymerization system in an inert gas or olefin gas atmosphere such as propylene, cause the component (A) to contact the component (B), and then cause one or more olefins such as propylene to contact the mixture. When the preliminary polymerization is carried out using the component (C) or the combination of the components (C) and (D), the component (B) is first added to the preliminary polymerization system in an inert gas or olefin gas atmosphere such as propylene, then the component (C) or a mixture of the component (C) and component (D) is caused to contact the component (B), followed by the contact of the solid catalyst component (A), and then one or more olefins such as propylene are caused to contact the mixture.

An alternative method comprises first adding the component (B) to the preliminary polymerization system in an inert gas or olefin gas atmosphere such as propylene and adding a previously contacted mixture of the component (A) and component (C) or the components (C) and (D) to the preliminary polymerization system.

The polymerization of olefins in the presence of the olefin polymerization catalyst prepared by the process of the present invention can produce olefin polymers with a melt flow rate (MI) higher than that of the polymers produced using a conventional catalyst by using the same amount of hydrogen. In addition, the olefin polymerization catalyst of the present invention exhibits the same performance as conventional catalysts in catalyst activity and the capability of producing polymers with high stereoregularity. Specifically, the catalyst of the present invention has been confirmed to improve the catalyst activity to hydrogen in the polymerization of olefins, while maintaining high catalyst activity and stereoregularity of the resulting polymers.

EXAMPLES

The present invention will be described in more detail by examples, which should not be construed as limiting the present invention.

(Evaluation of Polymerization)

Bulk polymerization of propylene using the olefin polymerization catalyst of the present invention was evaluated. The amount of polymer produced per unit amount of the solid catalyst component (polymerization activity: yield) was determined. Then, the ratio of n-heptane insoluble polymer (HI) when the polymer was extracted with boiling n-heptane for 6 hours using a high temperature Soxhlet extractor was determined. The yield and HI were respectively calculated according to the following equations (4) and (5). The melt flow rate (MI) and bulk density (BD) of the produced polymers were also determined, according to JIS K7210 and JIS K6721 respectively.

$$\text{Yield (g-PP/g-cat)}=a(g)/\text{solid catalyst component (g)} \quad (5)$$

$$\text{HI (wt \%)}=\{b(g)/a(g)\}\times 100 \quad (6)$$

wherein a indicates the amount (wt) of polymers produced upon completion of the polymerization reaction, b indicates the amount (wt) of n-heptane insoluble polymer when the polymer was extracted with boiling n-heptane for 6 hours after polymerization.

Example 1

(Preparation of Solid Catalyst Component)

A 2,000 ml round bottom flask equipped with a stirrer, of which the internal atmosphere had been sufficiently replaced by nitrogen gas, was charged with 150 g of diethoxy magnesium and 750 ml toluene to prepare a suspension. The suspension was added to a solution of 450 ml of toluene and 300 ml of titanium tetrachloride in another 2,000 ml round bottom flask equipped with a stirrer, of which the internal atmosphere had been sufficiently replaced by nitrogen gas. The suspension was reacted at 5° C. for one hour (low temperature aging processing). After the addition of 22.5 ml of di-n-butyl phthalate, the mixture was heated to 90° C. and reacted for two hours with stirring (first processing). After the reaction, the resulting reaction mixture was washed four times with 1,300 ml of toluene at 80° C. (intermediate washing). After the addition of 1,200 ml of toluene and 300 ml of titanium tetrachloride, the reaction mixture was heated to 112° C. and reacted for two hours with stirring (second processing). The intermediate washing and second processing were repeated once more. The resulting reaction mixture was washed seven times with 1,300 ml of heptane at 40° C., filtered, and dried to obtain a solid catalyst component (A) in the form of a powder. The content of titanium in the solid catalyst component was analyzed and found to be 3.74 wt %.

(Preparation of Polymerization Catalyst and Polymerization)

A 2,200 ml autoclave equipped with a stirrer, of which the internal atmosphere had been replaced by nitrogen gas, was charged with 1.3 mmol of triethyl aluminum. Then, 0.13 mmol of triethoxychlorosilane and the above solid catalyst component in an amount equivalent to 0.0026 mmol of titanium atom were added and the mixture was stirred to prepare a polymerization catalyst. Then, with the addition of 2,000 ml of hydrogen gas and 1,400 ml of liquid propylene, the preliminary polymerization was carried out for 5 minutes at 20° C., following which the main polymerization was carried out for one hour at 70° C. The evaluation results of polymerization are shown in Table 1.

Example 2

The same experiment as in Example 1 was carried out, except for using 0.13 mmol of diethoxydichlorosilane instead of 0.13 mmol of triethoxychlorosilane. The results are shown in Table 1.

Example 3

The same experiment as in Example 1 was carried out, except for using 0.13 mmol of $ClCH_2Si(OC_2H_5)_3$ instead of 0.13 mmol of triethoxychlorosilane. The results are shown in Table 1.

Example 4

The same experiment as in Example 1 was carried out, except for using 0.065 mmol of $ClCH_2Si(OC_2H_5)_3$ and 0.065 mmol of tetraethoxysilane instead of 0.13 mmol of triethoxychlorosilane. The results are shown in Table 1.

Example 5

The same experiment as in Example 4 was carried out, except for using 0.065 mmol of tetramethoxysilane instead of 0.065 mmol of tetraethoxysilane. The results are shown in Table 1.

Example 6

The same experiment as in Example 4 was carried out, except for using 0.065 mmol of dimethoxymethylchlorosilane instead of 0.065 mmol of tetraethoxysilane. The results are shown in Table 1.

Comparative Example 1

The same experiment as in Example 1 was carried out, except for using 0.13 mmol of cyclohexylmethyldimethoxysilane instead of 0.13 mmol of triethoxychlorosilane. The results are shown in Table 1.

Comparative Example 2

The same experiment as in Example 1 was carried out, except for using 0.065 mmol of cyclohexylmethyldimethoxysilane of the above formula (II) and 0.065 mmol of diethoxy dichlorosilane instead of 0.13 mmol of triethoxychlorosilane. This Comparative Example 2 is an experiment corresponding to Example 1 of the above-mentioned JP-A No. 218932/1998. The results are shown in Table 1.

Comparative Example 3

The same experiment as in Example 1 was carried out, except for using 0.065 mmol of cyclohexylmethyldimethoxysilane of the above formula (II) and 0.065 mmol of triethoxy chlorosilane instead of 0.13 mmol of triethoxychlorosilane. This Comparative Example 3 is an experiment corresponding to Example 2 of the above-mentioned JP-A No. 218932/1998. The results are shown in Table 1.

TABLE 1

| | Yield g-PP/g-cat | HI wt % | BD G/ml | MI G/10 min. |
|---|---|---|---|---|
| Example 1 | 35,500 | 98.6 | 0.43 | 62 |
| Example 2 | 37,300 | 98.3 | 0.44 | 61 |
| Example 3 | 35,200 | 98.5 | 0.43 | 49 |
| Example 4 | 32,500 | 98.5 | 0.43 | 64 |
| Example 5 | 33,800 | 98.3 | 0.44 | 12 |
| Example 6 | 39,500 | 98.3 | 0.43 | 16 |
| Comparative Example 1 | 32,100 | 98.8 | 0.43 | 3.2 |
| Comparative Example 2 | 34,700 | 98.8 | 0.42 | 3.7 |
| Comparative Example 3 | 31,800 | 98.6 | 0.43 | 3.0 |

The above results indicates great improvement in the catalyst activity to hydrogen when one or more halogen-containing silicon compounds of the above formula (2) and the halogen-containing silicon compounds of the above formula (3) are used as an electron donor in the polymerization.

INDUSTRIAL APPLICABILITY

The polymerization catalyst of the present invention exhibits excellent catalyst activity to hydrogen and, if olefins are polymerized using the catalyst of the present invention, can produce olefin polymers with a high melt flow rate. The catalyst also exhibits the same catalytic activity and yield performance as conventional catalysts, and possesses the capability of producing polymers with stereoregularity equivalent to conventional catalysts. The catalyst can thus overcome the problems of cost increase for improvement of facilities, increase in hydrogen gas consumption, and decrease in productivity.

The invention claimed is:

1. A propylene polymerization catalyst, consisting of:

(A) a solid catalyst component prepared by contacting (a) a dialkoxy magnesium, (b) a tetra-valent titanium halide, and (c) a plithalic acid diester in (d) an aromatic hydrocarbon having a boiling point in the range of 50 to 150° C.;

(B) an organoaluminum compound of formula (1):

$$R^1_pAlQ_{3-p} \quad (1)$$

wherein $R^1$ is an alkyl group having 1 to 4 carbon atoms, Q is a hydrogen atom or a halogen atom, and p is a real number that satisfies the inequality $0<p\leqq 3$; and (C) one or more halogen-containing organosilicon compounds selected from the group consisting of triethoxychlorosilane, methyldimethoxychlorosilane, methyldiethoxychlorosilane, n-butyldiethoxychlorosilane, t-butyldimethoxychlorosilane, t-butyldiethoxychlorosilane, cyclohexyldimethoxychlorosilane, cyclopentyldimethoxychlorosilane, $ClCH_2Si(OC_2H_5)_3$, $BrCH_2Si(OC_2H_5)_3$, $(ClCH_2)_2Si(OCH_3)_2$, $(ClCH_2)_2Si(OC_2H_5)_2$, $(BrC_2H_4)_2Si(OCH_3)_2$ and $(BrC_2H_4)_2Si(OC_2H_5)_2$.

2. A propylene polymerization catalyst comprising:

(A) a solid catalyst component prepared by contacting (a) a dialkoxy magnesium, (b) a tetra-valent titanium halide, and (c) a phthalic acid diester in (d) an aromatic hydrocarbon having a boiling point in the range of 50 to 150° C.;

(B) an organoaluminum compound of formula (1), $$R^1_pAlQ_{3-p} \quad (1)$$

wherein $R^1$ is an alkyl group having 1 to 4 carbon atoms, Q is a hydrogen atom or a halogen atom, and p is a real number satisfying an inequality $0<p\leqq 3$;

(C) one or more halogen-containing organosilicon compounds selected from the group consisting of $ClCH_2Si(OC_2H_5)_3$, $BrCH_2Si(OC_2H_5)_3$, $(ClCH_2)_2Si(OCH_3)_2$, $(ClCH_2)_2Si(OC_2H_5)_2$, $(BrC_2H_4)_2Si(OCH_3)_2$ and $(BrC_2H_4)_2Si(OC_2H_5)_2$; and (D) tetraethoxysilane or cyclohexylmethyldimethoxychlorosilane.

3. The propylene polymerization catalyst according to claim 1, wherein the dialkoxy magnesium is diethoxy magnesium.

4. The propylene polymerization catalyst according to claim 1, wherein the halogen-containing organosilicon compound (C) is triethoxychlorosilane.

5. The propylene polymerization catalyst according to claim 1, wherein the halogen-containing organosilicon compound (C) is $ClCH_2Si(OC_2H_5)_3$.

6. The propylene polymerization catalyst according to claim 2, wherein the organosilicon compound (D) is tetraethoxysilane.

7. The propylene polymerization catalyst according to claim 2, wherein the dialkoxy magnesium is diethoxy magnesium.

8. The propylene polymerization catalyst according to claim 2, wherein the halogen-containing organosilicon compound (C) is $ClCH_2Si(OC_2H_5)_3$.

* * * * *